United States Patent [19]

Hong

[11] 4,093,489

[45] June 6, 1978

[54] PROCESS FOR LAMINATING PHOTOGRAPHS AND THE LIKE INTO MOLDED ARTICLES OF MELAMINE-FORMALDEHYDE RESIN

[76] Inventor: Kwang Kil Hong, Rte. 2, Box 141, Colonial Beach, Va. 22443

[21] Appl. No.: 725,650

[22] Filed: Sep. 22, 1976

[51] Int. Cl.$^2$ .................... B29C 19/00; B44F 7/00
[52] U.S. Cl. .................... 156/245; 156/224; 156/246; 264/248; 264/271; 264/259; 428/13; 428/187; 428/76
[58] Field of Search ................ 156/57, 245, 214, 246, 156/228, 309, 242, 331, 224, 277, 249, 182, 288; 428/13, 79, 15, 80, 77, 530, 78, 525, 76, 187; 264/236, 259, 248, 271, 135, 132, 299; 250/67.6 R; 427/209

[56] References Cited

U.S. PATENT DOCUMENTS

| Re. 19,549 | 4/1935 | Byck et al. ....................... 264/271 |
| 1,908,075 | 5/1933 | Stalder ............................. 156/246 |
| 2,311,156 | 2/1943 | Casto ............................... 156/224 |
| 2,379,793 | 7/1945 | Eenigenburg ..................... 264/271 |
| 2,646,380 | 7/1953 | Barlow et al. ..................... 56/245 |
| 2,760,899 | 8/1956 | Cameron et al. .................. 156/245 |
| 2,833,685 | 5/1958 | Lawrence .......................... 428/13 |
| 3,074,840 | 1/1963 | Teplansky et al. ................ 156/224 |
| 3,117,053 | 1/1964 | Lawrence et al. ................. 156/224 |

*Primary Examiner*—David Klein
*Assistant Examiner*—J. J. Gallagher
*Attorney, Agent, or Firm*—Millen & White

[57] ABSTRACT

Photographs and other indicia-bearing opaque sheets of paper are laminated to molded articles by:

(a) positioning the opaque sheet of paper betweeen two flexible sheets of uncured catalyst-containing thermosetting melamine-formaldehyde condensation product, to form a layup;

(b) applying the layup to a surface of a shaped three-dimensional article formed of a partially cured catalyst-containing thermosetting melamine-formaldehyde molding resin, with the indicia-bearing surface of the opaque sheet facing away from said article; and (c) applying heat and pressure to the assembly to cure the condensation product and complete the cure of the partially cured resin.

7 Claims, No Drawings

PROCESS FOR LAMINATING PHOTOGRAPHS AND THE LIKE INTO MOLDED ARTICLES OF MELAMINE-FORMALDEHYDE RESIN

BACKGROUND OF THE INVENTION

This invention relates to a method of laminating molded articles formed of thermosetting melamine-formaldehyde resin and comprising an indicia-bearing opaque sheet, such as a photograph or other decorative surface, and to the laminated articles thusproduced.

Laminating layups for structures, such as plaques or plates have been made by the following techniques:

(a) A map, print or other decorative surface is obtained on the thinnest commercially available printing paper and coated with an aqueous solution of a laminating resin. After removal of solvent, the impregnated surface is heated to partially cure the resin to a condition suitable for thermosetting laminating techniques, in which the resinized decorative surface is placed over a resin underlay of resin-impregnated cellulosic paper and the layers are fused together by heat and pressure.

(b) Instead of precoating the decorative surface with laminating resin, the resinized protective overlay and the base underlay are processed to contain excess resin sufficient, under cure conditions, to flow into and partially penetrate and laminate the decorative surface.

(c) An absorbent sheet is impregnated with resin and cured to a condition suitable for laminating, whereupon the design is printed thereon by silk screen or flat press printing to avoid cracking the brittle resin-impregnated sheet. A composite of protective overlay, printed paper and base paper is then cured.

Deficiencies of these methods include a high reject rate and poor quality laminates, as indicated by blistering and surface crazing during heat testing, by partial delamination of the products, and by warpage of the composites.

An improved layup, disclosed in U.S. Pat. No. 3,537,950, uses an overlay sheet of 62–77% resin pick-up of melamine-formaldehyde resins and a base cover sheet of 35–55% resin pick-up to surround a porous inlay, e.g., α-cellulose paper. However, the application of this method is limited to cases in which the inlay has the requisite porosity characteristics.

Another improved process, disclosed in U.S. Pat. No. 2,833,685, requires treatment of papers, prior to offset lithography, with melamine-formaldehyde resin on one side thereof. Although sheets thus-treated are pliable and can be handled in conventional lithographic presses, the printed material must be further impregnated with resin prior to the final lamination step.

It will be apparent that all of the foregoing methods have deficiencies or require specialized materials. It would be highly desirable to provide a process which permits the fabricator to employ solutions of melamine-formaldehyde resin and melamine-formaldehyde powdered molding resins which are inexpensive, commercially available and can be reliably employed to fabricate custom-made items from colored or black and white photographs, etc.

SUMMARY OF THE INVENTION

In a process aspect, this invention relates to a process for the production of shaped plastic articles having an indiciabearing opaque sheet embedded therein and with indicia visible through a surface thereof, comprising the steps of:

(a) positioning an indicia-bearing opaque sheet of paper between two flexible sheets of uncured, catalyst-containing thermosetting water-soluble melamine-formaldehyde condensation product, to form a layup;

(b) applying the thus-produced layup to a surface of a three-dimensional shaped article formed of a catalyst-containing partially cured thermosetting melamine-formaldehyde molding resin, with the indicia-bearing surface of the sheet of paper facing away from the shaped article to form an assembly; and (c) curing the condensation product and completing the cure of the partially-cured resin by heating the thus-produced assembly under pressure.

In a product aspect, this invention relates to molded articles formed of thermosetting melamine-formaldehyde resin and having an indicia-bearing opaque sheet embedded in the surface thereof, made by the foregoing process.

DETAILED DISCUSSION

The indicia-bearing sheet of paper to be embedded in the molded article, for example, a photograph or printed surface, e.g., a diploma or certificate, can be in black or white but preferably is in color. It is not critical to the success of this invention that the paper inlay be of any particular porosity or of any particular thickness. However, conventional emulsion coated, paper backed photographs and especially colored photographs are preferred.

The flexible sheets of catalyst-containing, uncured melamine-formaldehyde condensation product between which the indicia-bearing sheet of paper is placed are translucent films formed by air-drying a thin layer of a catalyst-containing, aqueous solution of a water-soluble melamine-formaldehyde condensation product which forms transparent films when cured, including the modified melamine-formaldehyde resins disclosed in U.S. Pat. Nos. 2,773,788 and 3,202,635, whose disclosures are incorporated by reference.

Melamine-formaldehyde condensation products can be prepared by the condensation of melamine with aqueous formaldehyde. The resins thus-produced are heat curable in the presence of a curing catalyst. In the production of these resins, the molar ratio of formaldehyde to melamine can be of the order of from about 1 : 1 to about 6 : 1, respectively, but a ratio of about 1.5 : 1 to about 4 : 1 is preferred.

Generally, the condensation is carried out at pH 7.5 to 10 and at a temperature between about 50° to about 100° C. When carrying out the condensation, the reaction components can be added in any desired sequence. It is advantageous to hold the pH constant during the condensation. The termination of the condensation is conventionally determined by a dilution or precipitation test.

The thus-produced aqueous solution of melamine-formaldehyde condensation product can be used to form the flexible sheets employed in the process of this invention by mixing with an effective amount of a curing catalyst, forming a layer thereof on a suitable flat surface, e.g., glass, stainless steel or "Teflon" coated aluminum, and drying below curing temperature, e.g., 20°–100° C., preferably about room temperature, to form flexible translucent films of uncured, water-soluble condensation product between which the picture or other indicia-bearing surface is positioned in the starting assembly.

The precondensates obtained by the aforesaid condensation can be used not only to produce the flexible translucent films employed in the asembly of this invention but can also be converted to a powder by spray-drying or drying on drums, before or after being mixed with suitable filler, e.g., cellulose, to produce the molding resin employed to form the starting shaped articles formed of partially cured catalyst-containing melamine-formaldehyde resin.

The translucent flexible sheets used in making the layup assembled in accordance with this invention generally are 1/64 – ¼ inch, preferably about 1/16 – 1/32 inch, thick.

The term "cure" as applied to melamine-formaldehyde resins, is a relative term but is generally understood to mean conversion of the resinous condensate to a substantially insoluble and infusible state. Complete cure, as applied to the laminated products of this invention, means that the products exhibit satisfactory inertness in conventional tests, such as resistance to heat and chemicals. The tests employed to determine such resistance are well known.

The "partially cured resins" employed in the starting three-dimensional shaped articles employed in this invention are melamine-formaldehyde resins which are cured about half-way, e.g., 55–65%, to completion, i.e., if an uncured resin requires 6–8 minutes at 140° C. to reach solvent and water inertness, the starting uncured molding resins are cured for about 3–4 minutes at that temperature to product the starting partially cured three-dimensional articles.

A variety of well-known acid condensation catalysts can be used for curing melamine-formaldehyde resins, as used in producing the starting translucent sheets and in molding the three-dimensional shaped articles formed into a laminate. These include inorganic acids, e.g., sulfuric, hydrochloric, phosphoric or boric acids; organic acids and anhydrides, e.g., tartaric, benzoic, acetic, propionic, adipic, oxalic and fumaric acids, as well as hexachlorophthalic or maleic anhydrides; and acid salts, e.g., ammonium chloride, ammonium sulfate, monosodium phosphate, etc. The preferred catalyst is ammonium chloride.

The amount of acid catalyst conventionally used in both the translucent sheets and the three-dimensional articles ranges from about 0.02% to about 5% by weight of the resinous composition, but preferably is about 0.02 – 0.5% by weight.

Techniques applicable to the preparation of the starting partially cured melamine-formaldehyde molded articles include those set forth in U.S. Pat. Nos. 2,801,198 and 3,294,622. The starting molded article can be produced by the application of heat and pressure to the starting molding resin in a suitable mold. This can be accomplished by filling the mold with a mixture of a conventional molding resin, e.g., "Melmac" powdered molding resin (American Cyanamid) and a curing catalyst and applying heat and pressure until the resin is about half cured.

The starting molded article or core will generally be of the order of at least ⅛ inch, but can be of any desired thickness, e.g., which imparts the desired rigidity and strength to the cured assembly.

The application of heat and pressure to the molding resin to form the starting partially cured shaped article and to the starting assembly is generally done in a press comprising polished steel plates, which are inserted between a pair of heated platens of a hydraulic press, forming a sandwich mold.

The curing temperature, both for forming the starting three-dimensional shaped article and for forming the final fully cured assemblies of this invention can be from about 120° to about 150° C., preferably 140°–145° C. The pressure applied is about 0.5–3 tons per square inch. Pressures of about 1–2 tons per square inch are preferred. Under these conditions, lamination of the decorative surface to the partially-cured molded article can be accomplished in about 3–10 minutes, the optimum time varying inversely with the curing temperature and, to a lesser extent, directly with the thickness of the assembly.

The partially cured, molded resin is then removed from the press, the layup of a photograph or other indicia-bearing sheet of paper between two sheets of uncured melamine-formaldehyde condensation product is applied to a surface thereof, the resultant assembly is re-inserted in the mold and heat and pressure again applied until both the partially cured molding resin and uncured condensation product are fully cured.

Surprisingly, laminated products prepared in accordance with this invention permanently protect the picture or decorative surface from staining, deterioration by sunlight, effects of extremely high or low temperatures or moisture. This effect is particularly striking with colored photographs, whose colors are unaffected and preserved. These results follow from the fact that the process of this invention produces a finished product free of entrapped air and which is not subject to surface roughness or to delamination with resultant exposure to the effects of air and moisture.

The method of this invention is applicable to black and white or colored photographs, portraits, paintings, diplomas and the like. The molded articles can be flat, e.g., self-framed pictures, or can have concave, convex or irregular surfaces, e.g., plates, saucers, ash trays, or any other shape whose curvature does not exceed the limits of conformability of the photograph or like material to be laminated thereto.

Without further elaboration, it is believed that one skilled in the art can, using the preceding description, utilize the present invention to its fullest extent. The following preferred specific embodiment is, therefore, to be construed as merely illustrative and not limitative of the remainder of the disclosure in any way whatsoever.

EXAMPLE 1

A. Layup Preparation

Mix 0.03 g. of $NH_4Cl$ with 100 g. of an aqueous solution of commercially available, water-soluble melamine-formaldehyde liquid resin. Cast the mixture onto a stainless steel sheet to form a uniform layer large enough to form a 12-inch dinner plate and air dry to form a flexible translucent sheet 1/32 of an inch thick. The dried sheet is then peeled from the stainless steel sheet.

B. Molded Partially-Cured Resin Preparation

Pour a mixture of powdered melamine-formaldehyde molding resin* ("Melmac") and 0.03 g. $NH_4Cl$ per 100 g. resin into a 12-inch dinner plate sandwich mold and cure at about 135° C. for 3–4 minutes under 1.33 tons per square inch pressure. Remove the mold to obtain a flexible partially cured (about 60%) dinner plate.

*Composition of Melamine Molding Composition

C. Assembly Preparation

Insert a conventional paper-backed emulsion-surfaced, colored photograph between two translucent, flexible sheets of the air-dried catalyst-containing melamine-formaldehyde condensation product, prepared as described in A, above. The resulting layup is placed on a 12 inch dinner plate formed of partially-cured melamine-formaldehyde molding resin, prepared as described in B, above, so that the picture faces away from the plate surface. The resulting assembly is then again placed in the same dinner plate mold and cured at about 140° C. at a pressure of about 1.33 tons per square inch (150 tons total) for about 3–4 minutes and then removed from the mold.

The photograph can be seen in the finished assembly with absolute clarity with color values unaffected and which remain unchanged over prolonged periods of time.

|  | Parts |
| --- | --- |
| Urea | 60 |
| Melamine | 126 |
| Formalin (30%) | 300 |
| α- Cellulose (85–88%) | 160 |
| Ammonia (d = 0.90) | 5.0 |
| Carbonic Magnesium | 0.25 |
| Activated Carbon | 1 |
| Stearic Acid Zinc $(C_{17}H_{35}(O_2)Zn$ | 1.2 |

The preceding example can be repeated with similar success by substituting the generically or specifically described reactants and/or operating conditions of this invention for those used in the preceding example.

From the foregoing description, one skilled in the art can easily ascertain the essential characteristics of this invention and, without departing from the spirit and scope thereof, can make various changes and modifications of the invention to adapt it to various usages and conditions.

What is claimed is:

1. A process for the production of a rigid molded decorative assembly comprising a decorative element embedded in melamine-formaldehyde resin, comprising the steps of:
    (a) sandwiching a decorative element, consisting of an indicia-bearing opaque sheet of paper, between two flexible cast, preformed, self-supporting uncured translucent resin films formed by drying a layer of a catalyst-containing aqueous solution of a thermosetting melamine-formaldehyde condensation product at below curing temperature, to form a layup;
    (b) overlaying the thus-produced layup onto a surface of a flexible three-dimensional molded article formed of a catalyst-containing partially-cured melamine-formaldehyde filled molding resin, with the indicia-bearing surface of the sheet of paper facing away from the molded article, to form an assembly; and
    (c) curing the melamine-formaldehyde condensation product completing the cure of the partially-cured molding resin, conforming the layup to the shape of the molded article and bonding the layup thereto by heating the thus-produced assembly under pressure in a mold, to produce the rigid decorative assembly.

2. The process of claim 1 wherein the indicia-bearing opaque sheet is a colored photograph.

3. The process of claim 1 wherein the resin of the starting shaped article is cured to the extent of about 45–65%.

4. A process according to claim 1 wherein the layer is dried at about room temperature.

5. The process of claim 1, wherein the assembly is heated at about 120°–150° C. at a pressure of about 1–2 tons per square inch for about 3–10 minutes.

6. The process of claim 1 wherein the curing catalyst in the partially cured melamine-formaldehyde resin of the starting article and in the starting flexible sheets of melamine-formaldehyde condensation product is $NH_4Cl$.

7. The process of claim 1 wherein the resin of the starting shaped article is cured to the extent of about 60%, and wherein the assembly is heated at 140°–145° C. at a pressure of about 1.33 tons per square inch for about 3–4 minutes.

* * * * *